Feb. 9, 1965   R. H. DALTON   3,169,217
OPAQUE GLASS ENCLOSURE OF SPECIFIC COMPOSITION
FOR SEMICONDUCTOR DEVICE
Filed July 1, 1959
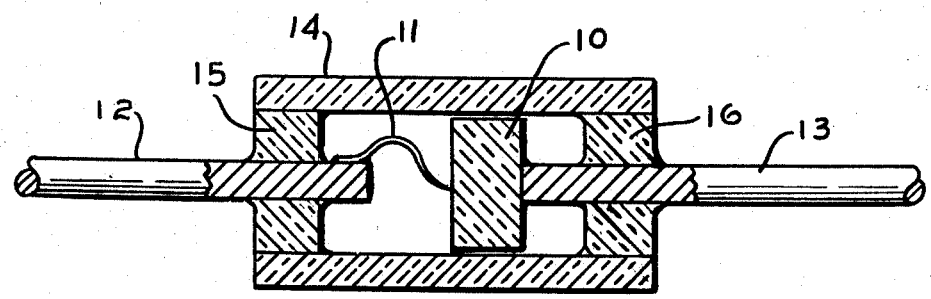
INVENTOR.
ROBERT H. DALTON
BY
Clarence R. Patty, J.
ATTORNEY

United States Patent Office 3,169,217
Patented Feb. 9, 1965

3,169,217
OPAQUE GLASS ENCLOSURE OF SPECIFIC COMPOSITION FOR SEMICONDUCTOR DEVICE
Robert H. Dalton, Corning, N.Y., assignor to Corning Glass Works, Corning, N.Y., a corporation of New York
Filed July 1, 1959, Ser. No. 824,369
3 Claims. (Cl. 317—234)

This invention relates to an opaque glass which is particularly suitable as a container for semi-conductive crystals utilized in electronic components such as transistors and diodes.

Many electronic components have been produced by hermetically sealing suitable crystals such as germanium or silicon in glass enclosures to protect the crystals from deterioration by reaction with undesirable constituents of the atmosphere such as water vapor. Heretofore the glass utilized has been clear glass selected on the basis of favorable expansion properties to allow electrical leads to pass therethrough and with sufficient electrical resistivity to prevent shorting of the components. The glass enclosed units have then been coated with a dense black paint to prevent change in the characteristics of the crystal which results from its exposure to electromagnetic energy having wave lengths between 0.2–2.0 microns, that is, from the ultra violet region through the visible spectrum into the region of the near-infra-red. Although it is readily appreciated that an opaque glass would eliminate the time-consuming and expensive operation of painting the finished component as well as producing a coating which would not be subject to chipping or abrasion, it was not believed to be possible to produce a glass which was suitable in all other respects and still have the intense opacity required to absorb the detrimental radiations even in the very thin sections desired.

An object of this invention is to provide a glass which, in sections as thin as 0.5 millimeter and even less, is substantially opaque to radiations between 0.2 and 2.0 microns, has an electrical resistivity greater than 100,000 ohms/cm. at 350° C. and greater than 3,000,000 ohms/cm. at 250° C., an expansion coefficient of 85 to $95 \times 10^{-7}/°$ C. between 0° C. and 300° C., an equivalent setting point between 420° C. and 490° C., and a viscosity of at least 15,000 poises at its liquidus to permit drawing of tubing on automatic machines.

Another object of this invention is to provide a suitable glass-to-metal seal between an opaque glass and a copper-sheathed iron-nickel wire, known in the trade as "Dumet" wire.

A still further object of this invention is to provide a semi-conductive device comprising a hermetically sealed, opaque glass container.

Other objects will become apparent to one skilled in the art upon reading the description of the invention as hereinafter set forth, and a consideration of the drawing attached hereto.

The single figure drawing illustrates a cross-section view, greatly enlarged, of a particularly suitable application for the present invention.

I have now found that the above objectives can be achieved in a glass containing by weight as computed from the batch 65–76% $SiO_2$, 0–15% $Na_2O$, 0–20% $K_2O$, 12–20% $R_2O$, 2–5% cobalt oxide computed as $Co_3O_4$, 2–10% iron oxide computed as $Fe_2O_3$, 0.2–1.1% sulfur determined as free sulfur, 1–10% CaO, 0–10% MgO, 1–10% RO, and 0–5% $Al_2O_3$, and up to 3% carbon computed as free carbon.

The glass-making constituents must be maintained within the above prescribed limits in order to produce all of the necessary requirements in the glass. Thus the alkali content must not be less than 12% in order to maintain the desired expansion while an amount in excess of 20% gives too high an expansion and decreases resistivity to an undesirable level. At least 1% and preferably 2% of CaO must be present in the glass to produce the desired resistivity and chemical durability. More than 10% CaO raises the annealing point of the glass objectionably. MgO may be substituted for some of the CaO without objectionable effects. Up to 5% alumina may be included in the glass, preferably 2–3%, in order to increase the durability of the glass and to decrease the liquidus of the glass so that it will not occur at too low a viscosity.

The amount of iron oxide, cobalt oxide, and sulfur are critical and each such constituent must be maintained individually and collectively within the stated ranges to produce a usable product. Thus, less than the minimum amount of any of these three constituents results in a glass which does not have the desired opacity throughout the whole range of 0.2–2.0 microns. While these constituents have been found to be compatible in a glass melt when present in the specified proportions, exceeding the specified ranges of any one, or more of these three constituents results in the precipitation of metallic cobalt in the glass which makes the glass inhomogeneous and the cobalt will separate from the glass in the melting unit causing failure of the tank or pot because of rapid refractory attack thereby.

Examples of suitable glass compositions, as computed from the batch, are set forth in Table I. The stated amounts of the metallic oxides total 100% while the amounts of sulfur and carbon are given in excess of 100% as to the extent that they remain in the final glass, they probably are present in anionic form.

TABLE I

|  | 1 | 2 | 3 | 4 | 5 | 6 | 7 | 8 | 9 | 10 | 11 | 12 |
|---|---|---|---|---|---|---|---|---|---|---|---|---|
| $SiO_2$ | 69.6 | 71 | 76 | 69 | 70 | 68 | 68 | 73 | 70 | 69.2 | 72 | 69 |
| $Na_2O$ | 14.6 | 14 | 15 | 14 | 13 | 12 | 10 | 11 | 14 | 13.8 | 15 | 14 |
| $K_2O$ | 1 | 1 | 1 | 1 | 1 | 3 | 5 | 5 | 1 | 1 |  | 1 |
| CaO | 3.5 | 3 | 3 | 3 | 5 | 4 | 4 | 5 | 2 | 3 | 6 | 2 |
| MgO | 2.4 |  |  |  |  |  |  |  |  |  |  | 1 |
| $Al_2O_3$ | 2.2 |  | 1 | 2 |  | 2 | 2 |  | 2 | 2 | 2 | 2 |
| $Fe_2O_3$ | 4.7 | 9 | 2.0 | 9 | 9 | 9 | 9 | 2.0 | 9 | 9 | 3 | 9 |
| $Co_3O_4$ | 2 | 2 | 2 | 2 | 2 | 2 | 2 | 2 | 2 | 2 | 2 | 2 |
| S | 1.1 | 1.0 | 1.0 | 1.0 | 0.8 | 1.0 | 1.0 | 1.0 | 1.0 | 1.0 | 1.0 | 0.2 |
| C | 0 | 2.8 | 1.0 | 2.8 | 2.8 | 2.8 | 2.8 | 1.0 | 2.8 | 2.8 | 0.9 | 2.8 |

These glasses must be melted under reducing conditions which are achieved by selecting bath materials which are non-oxidizing in character and include suitable materials which are reducing in character. It is apparent from the composition of the final glass which includes sulfur, that elemental sulfur can be included as a reducing agent in the batch, but it is more economical to add the sulfur as iron sulfide, which is an efficient reducing agent. The amount of the reducing material which is added to the batch is critical and depends upon the type of melting unit utilized. A suitable means for adjusting the reducing conditions is by varying the proportion of iron sulfide to magnetite, or by adding carbonaceous reducing matter such as iron oxalate, graphite, lamp black or powdered coal to the batch.

A preferred batch for melting the glass in a 96%-silica crucible in an electrically heated furnace is as follows, in parts by weight:

| | |
|---|---|
| Pulverized sand | 308 |
| Sodium carbonate | 120 |
| Dolomitic limestone | 55 |
| Georgia feldspar | 55 |
| Cobalt oxide | 10 |
| Ferrous sulfide | 15 |
| Magnetite | 10 |

A glass having the compositions set forth in Example 1 of Table I is produced from this batch in about four hours at a temperature of 1450° C.

The glass so produced has an expansion of $91 \times 10^{-7}/°$C. (0-300° C.), an equivalent setting point of 444° C., an electrical resistivity of $3.1 \times 10^6$ ohms/cm. at 250° C. and 125,000 ohms/cm. at 350° C., a viscosity of more than 30,000 poises at its liquidus and is at least 99.5% opaque to all radiations of wave lengths between 0.2 micron and 2.0 microns in a thickness of 18 mils. (Equivalent setting point is a hypothetical temperature utilized in the trade for describing the temperature at which the glass becomes rigid when in sealing relationship to a metal and is further explained in the article entitled "Stresses in Glass-Metal Seals" in Jour. Am. Cer. Soc., vol. 3, No. 7, pp. 224 et seq. (July 1950).)

This same batch is not suitable for melting the glass in a pot type furnace as the cobalt oxide is reduced to the molten metal which attacks the pot and causes the pot to disintegrate. However a suitable batch for melting in a pot is obtained by reducing the amount of iron sulfide in the above batch while increasing the magnetite. Thus, while the total sulfur in the batch is thereby reduced, less is lost by volatilization from the pot than from a crucible during the melting process. As sulfur in the sulfide or free sulfur state can be readily oxidized at the elevated temperatures encountered during melting of this glass, the amount of sulfur remaining in the glass is less than the amount calculated from the batch. Likewise, when carbon is introduced into the batch in a reduced state, some of it will be oxidized to $CO_2$ which vaporizes from the glass melt and hence the amount of carbon remaining in the glass is less than the amount calculated on the basis of the reduced carbon added to the batch.

The glasses of this invention are particularly suitable for the formation of a container, or envelope, for a semiconductive crystal because they are opaque to radiation having wave lengths between 0.2 to 2.0 microns. By the term "opaque" I mean transmitting less than 1% of the radiation of any particular wave length in the thickness limits prescribed. Furthermore, these glasses have viscosity characteristics which permit forming them into thin walled tubes by conventional tube-drawing apparatus and the glasses possess expansion characteristics and other desirable properties, such as setting point, which allow them to be sealed directly to copper-sheathed iron wire, of the type described in U.S. Patent 1,140,136, which is utilized for making electrical contact to the crystal in the container through the walls of the container.

In the drawing, which illustrates in cross-section an hermetically-sealed semiconductive device comprising a semi-conductor element 10, such as a crystal of germanium or silicon, a point contact element 11, a conductor 12 in electrical contact with the point contact element and a second conductor 13 in electrical contact with the semi-conductor element. Both conductors, 12 and 13, are copper-sheathed iron-nickel wire. The electricity-carrying elements are hermetically sealed within an opaque glass container comprising an outer glass tube 14 and glass beads 15 and 16, each of said glass elements consisting essentially by weight as calculated from the batch 0-15% $Na_2O$, 0-20% $K_2O$, 12-20% $R_2O$, 1-10% CaO, 0-10% MgO, 1-10% RO, 0-5% $Al_2O_3$, 2-5% cobalt oxide computed as $Co_3O_4$, 2-10% iron oxide computed as $Fe_2O_3$, and 0.2-1.1% sulfur computed as free sulfur, 0-3% reduced carbon computed as free carbon, and 65-75% $SiO_2$. The glass beads 15 and 16 are sealed to the conductors 12 and 13, respectively, and each bead is also sealed to the outer glass tube 14.

The preferred method of making the glass-to-metal seal is by utilizing a bead cut from glass tubing of the specified composition containing a central hole with a diameter slightly greater than the wire diameter. The bead is then slipped on the wire and rapidly heated to a temperature of about 700° C. to rapidly fuse the bead to the wire. A suitable method of heating the bead is an oxy-hydrogen torch adjusted to a neutral flame.

In making the hermetically sealed semiconductor, one sub-combination comprising a bead sealed to a conductor having the point contact element affixed thereto and another comprising a bead sealed to a conductor and to the outer glass tube are preferably assembled prior to the assembly of the complete device. This assembly then requires only sealing of the glass bead to the outer glass tube in close relationship with the semiconductive element.

What is claimed is:

1. A sealing glass opaque to radiation with wave lengths of 0.2-2.0 microns and suitable for sealing to copper-sheathed nickel-iron wire, said glass consisting essentially by weight as computed from the batch of 0-15% $Na_2O$, 0-20% $K_2O$, 12-20% $R_2O$, 1-10% CaO, 0-10%, MgO, 1-10% RO, 0-5% $Al_2O_3$, 2-5% cobalt oxide computed as $Co_3O_4$, 2-10% iron oxide computed as $Fe_2O_3$, 0.2-1.1% reduced sulfur computed as free sulfur, up to 3% reduced carbon computed as free carbon, and 65-76% $SiO_2$.

2. A sealing glass according to claim 1 consisting essentially by weight as computed from the batch of 69% $SiO_2$, 14% $Na_2O$, 1% $K_2O$, 2% CaO, 1% MgO, 2% $Al_2O_3$, 2% cobalt oxide computed as $Co_3O_4$, 9% iron oxide computed as $Fe_2O_3$, 0.2% reduced sulfur computed as free sulfur, and 2.8% reduced carbon computed as free carbon.

3. An hermetically sealed semiconductor device comprising a semiconductor element, a point contact element, an outer glass tube, two conductors, each extending through a glass bead and sealed thereto, said first conductor electrically connected with said point contact element, said second conductor electrically connected with said semiconductor element, each of said beads sealed to said outer glass tube, characterized by the fact that each conductor consists of copper-sheathed nickel-iron wire and each glass element consists essentially by weight as computed from the batch of 0-15% $Na_2O$, 0-20% $K_2O$, the total $Na_2O$ and $K_2O$ being 12-20%, 1-10% CaO, 0-10% MgO, the total CaO and MgO being 1-10%, 0-5% $Al_2O_3$, 2-5% cobalt oxide computed as $Co_3O_4$, 2-10% iron oxide computed as $Fe_2O_3$, 0.2-1.1% reduced sulfur computed as free sulfur, up to 3% reduced carbon computed as free carbon, and 65-76% $SiO_2$.

References Cited in the file of this patent

UNITED STATES PATENTS

| | | |
|---|---|---|
| 756,676 | Midgley | Apr. 5, 1904 |
| 2,582,852 | Shoemaker | Jan. 15, 1952 |
| 2,669,807 | Smith | Feb. 23, 1954 |
| 2,755,212 | Brown | July 17, 1956 |
| 2,830,238 | Gudmundsen | Apr. 8, 1958 |
| 2,844,637 | Borel et al. | July 22, 1958 |

OTHER REFERENCES

Mellor: Treatise on Inorganic and Theoretical Chemistry, vol. 14, page 579.